US008478367B2

(12) United States Patent
Lee et al.

(10) Patent No.: US 8,478,367 B2
(45) Date of Patent: Jul. 2, 2013

(54) PORTABLE TERMINAL HAVING SLIDING MODULE

(75) Inventors: Hee-Jeon Lee, Gumi-si (KR); Bong-Hee Cho, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1528 days.

(21) Appl. No.: 12/037,809

(22) Filed: Feb. 26, 2008

(65) Prior Publication Data

US 2008/0225495 A1     Sep. 18, 2008

(30) Foreign Application Priority Data

Mar. 13, 2007 (KR) ........................ 10-2007-0024597

(51) Int. Cl.
*H04M 1/00* (2006.01)

(52) U.S. Cl.
USPC ...................... 455/575.4; 455/575.1; 361/727

(58) Field of Classification Search
USPC .............................. 455/575.4, 575.1; 361/727
See application file for complete search history.

(56) References Cited

U.S. PATENT DOCUMENTS

| 7,496,388 | B2 * | 2/2009 | Kim | 455/575.4 |
| 7,831,285 | B2 * | 11/2010 | Lee | 455/575.4 |
| 2002/0137476 | A1 * | 9/2002 | Shin | 455/90 |
| 2005/0095995 | A1 * | 5/2005 | Bae | 455/90.3 |
| 2006/0178176 | A1 * | 8/2006 | Kwak et al. | 455/575.4 |

FOREIGN PATENT DOCUMENTS

| JP | 2005-159633 A | 6/2005 |
| KR | 20-2000-0017402 U | 9/2000 |
| KR | 2003-79311 Y1 | 3/2005 |
| KR | 10-2005-0056705 A | 6/2005 |
| KR | 10-2006-0031430 A | 4/2006 |
| KR | 10-2007-0006236 A | 1/2007 |
| KR | 10-2007-0010411 A | 1/2007 |
| KR | 10-2007-0023363 A | 2/2007 |
| KR | 10-2007-0024237 A | 3/2007 |
| WO | 2006/031078 A1 | 3/2006 |
| WO | 2006/067259 A1 | 6/2006 |

* cited by examiner

*Primary Examiner* — Lester Kincaid
*Assistant Examiner* — Steven Kelley
(74) *Attorney, Agent, or Firm* — Jefferson IP Law, LLP

(57) ABSTRACT

A sliding type of a portable terminal is provided. The terminal includes a first housing, a second housing adapted to slide on the first housing, and a sliding module for coupling the second housing to the first housing so as to slide. The sliding module includes a guide member mounted on a surface of the first housing, at least one guide hole extending in a longitudinal direction of the guide member, and a slide member extending through the guide member via the guide hole to be mounted on the second housing, the slide member moving along the guide hole and supporting a sliding movement of the second housing. The portable terminal limits the play of the housings in other directions than the sliding direction. This guarantees a smooth sliding movement and improves the structural stability of the terminal.

17 Claims, 7 Drawing Sheets

PORTABLE TERMINAL HAVING SLIDING MODULE

PRIORITY

This application claims the benefit under 35 U.S.C. §119(a) of a Korean patent application filed with the Korean Intellectual Property Office on Mar. 13, 2007 and assigned Serial No. 2007-24597, the entire disclosure of which is hereby incorporated herein by reference.

BACKGROUND OF THE INVENTION

1. Field of the Invention

The present invention relates to a portable terminal. More particularly, the present invention relates to a sliding-type portable terminal having a pair of housings coupled to each other so as to slide while facing each other.

2. Description of the Related Art

Generally, portable terminals are classified into bar-type terminals, flip-type terminals and folder-type terminals according to their appearance.

The bar-type terminals have data input/output units and transmitter/receiver units mounted on a single body housing. The bar-type terminals have a problem with the data input units, i.e. keypad, which are always exposed and may be erroneously operated. In addition, a distance must be secured between the transmitter and receiver.

The flip-type terminals have a body, a flip and a hinge module for connecting the body and the flip to each other. The body is provided with data input/output units and transmitter/receiver units. Although the flip-type terminals are advantageous in that the flip covers the data input units, i.e. keypad, in a standby mode so as to avoid erroneous operations, a distance must be secured between the transmitter and receiver, as in the case of the bar-type terminals.

The folder-type terminals have a body, a folder and a hinge module for rotatably connecting the body and the folder to each other so that the folder is rotated to open/close the terminals. When the folder is folded on the body (i.e. in a standby mode), erroneous operations of the keypad are avoided. When the folder is unfolded (i.e. in a communication mode), a sufficient distance is secured between the transmitter and receiver. This structure is advantageous for compactness. Therefore, the folder-type terminals are becoming dominant in the portable terminal market.

Furthermore, sliding-type portable terminals have recently been commercialized as a result of efforts to diversify the design of portable terminals. The sliding-type portable terminals have two housings, one of which is slid on the other in the longitudinal direction to open/close the terminals. In order to ensure that the housings can slide smoothly in the longitudinal direction, a gap is maintained between the housings.

However, such a gap between housings of a sliding-type terminal may cause the housings to play in the longitudinal or transverse direction even when they are stationary. In other words, the gap between housings allows one of them to play relative to the other. If such a play is repeated, the gap between housings widens and, in the end, the coupling structure of the housings weakens. This may damage the terminal.

In addition, the play occurring between housings when the terminal is closed/carried or when it is opened/used makes the user irritated and worried that the terminal may be broken.

SUMMARY OF THE INVENTION

An aspect of the present invention it to address the above-mentioned problems and/or disadvantages and to provide at least the advantages described below. Accordingly, an aspect of the present invention is to provide a sliding-type portable terminal having housings adapted so that they can slide smoothly relative to each other but they do not play relative to each other when the terminal is opened or closed.

Another aspect of the present invention is to provide a sliding-type portable terminal having housings adapted so that they do not play relative to each other when the terminal is opened or closed, thereby improving the reliability and durability.

Furthermore, another aspect of the present invention is to provide a sliding-type portable terminal having housings adapted so that they do not play relative to each other when the terminal is opened or closed, thereby relieving the user of irritation or anxiety otherwise caused by the play.

In accordance with an aspect of the present invention, a portable terminal is provided. The terminal includes a first housing, a second housing adapted to slide on the first housing, and a sliding module for coupling the second housing to the first housing so as to slide, wherein the sliding module includes a guide member mounted on a surface of the first housing, at least one guide hole extending in a longitudinal direction of the guide member, and a slide member extending through the guide member via the guide hole to be mounted on the second housing, the slide member moving along the guide hole and supporting a sliding movement of the second housing.

In accordance with another aspect of the present invention, a portable terminal is provided. The terminal includes a first housing, a guide member mounted on a surface of the first housing, and a second housing having a pair of guide slits extending on a rear surface in a longitudinal direction, wherein both lateral ends of the guide member extend into the second housing via the guide slits so as to fasten the second housing to the first housing and guide a sliding movement of the second housing.

In accordance with another aspect of the present invention, a portable terminal having a sliding module is provided. The terminal includes a guide member mounted on a first housing and a slide member mounted on a second housing and coupled to a guide hole, which is formed on the guide member, so as to slide. The slide member fastens the guide member to the second housing. As such, the first and second housings are coupled to each other so as to slide by the guide member and the slide member. The slide member has a portion supported on a surface of the guide member, and the remaining portion extends through the guide hole to be mounted on the second housing. The second housing can slide in the longitudinal direction of the first housing, but the play in the transverse or forward/backward direction is limited when it remains stationary.

BRIEF DESCRIPTION OF THE DRAWINGS

The above and other aspects, features, and advantages of certain exemplary embodiment of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and configurations are omitted for clarity and conciseness.

Figure 1:
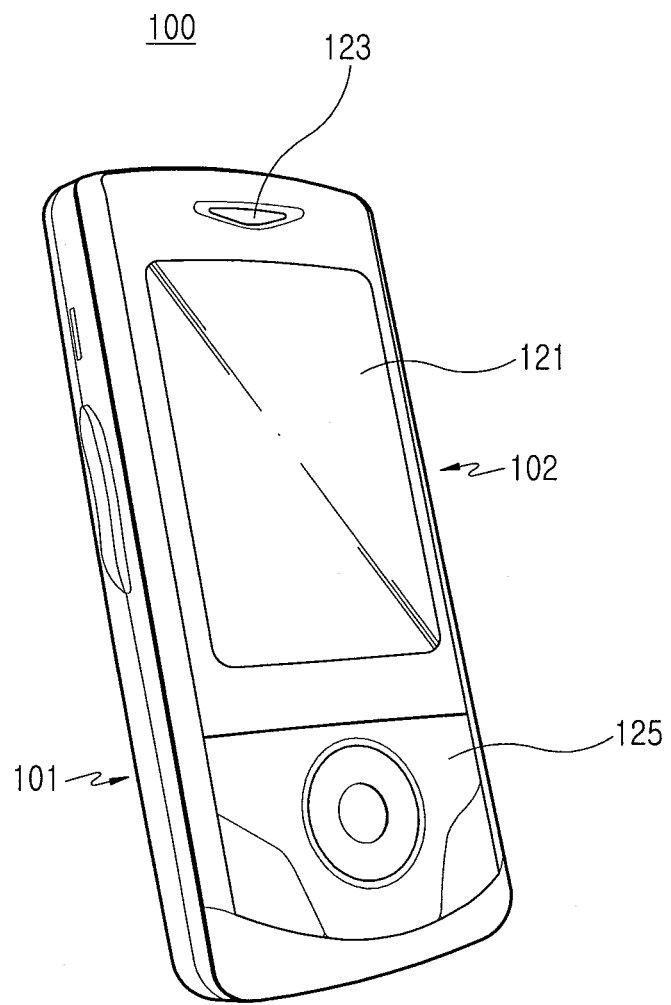
FIG. 1 is a perspective view of a portable terminal having a sliding module according to an exemplary embodiment of the present invention.
Figure 2:
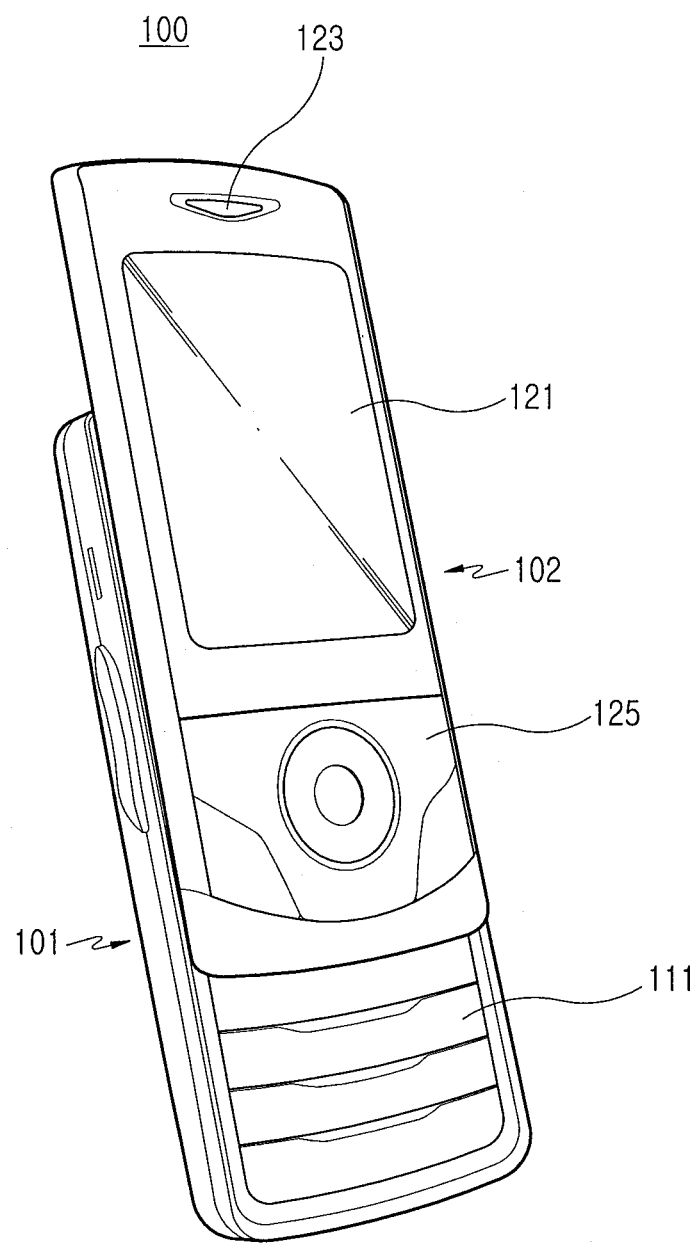
FIG. 2 is a perspective view of the portable terminal shown in FIG. 1 when it is opened.

As shown in FIGS. 1 and 2, a portable terminal 100 having a sliding module according to an exemplary embodiment of the present invention includes a first housing 101 and a second housing 102 coupled to the first housing 101 so as to slide in the longitudinal direction while facing it. A part of a surface of the first housing 101 is exposed/covered by a sliding movement of the second housing 102.

The first housing 101 has a keypad 111 positioned on a surface thereof in such a manner that it is exposed/covered by a sliding movement of the second housing 102. Particularly, the keypad 111 is positioned on a part of a surface of the first housing 101, which is exposed/covered by the second housing 102. The keypad 111 is commonly used to input characters, numerals, etc. In addition, the first housing 101 has a memory slot, an interface connector, a volume adjustment key, etc. properly distributed and positioned on both lateral surfaces, a bottom surface and the like.

The second housing 102 has a display device 121 positioned on a surface thereof, a receiver 123 positioned above the display device 121, and a functional keypad 125 positioned below the display device 121. The display device 121 outputs information regarding the condition of the terminal 100, received messages, taken images and stored information via the display device 121. The receiver 123 outputs sound information. The functional keypad 125 includes a key for starting/ending communication, a navigation key and a key for calling and selecting/canceling menus so that it is used to select and activate functions of the terminal 100.

The terminal 100 may have a transmitter (not shown) for voice communication. The transmitter is positioned on the bottom surface of the second housing 102. If necessary, the transmitter may lie next to the keypad 111 or on the bottom surface of the first housing 101.

As shown in FIG. 1, when the second housing 102 covers the first housing 101, the user is solely allowed to operate the functional keypad 125. In this condition, the user can play games. Alternatively, received messages or stored information is outputted via the display device 121 or the receiver 123. In other words, music, moving image files, etc. can be played even when the first housing 101 is covered. As such, the terminal 100 can be used as a multimedia device.

As shown in FIG. 2, when the first housing 101 is exposed, the user can operate the keypad 111, which is used to input numerals, characters, etc. In this condition, the user can call a desired person for voice communication, compose/transmit a short message or compose a lengthy message, a document and the like.

The construction of the sliding module, which couples the first and second housings 101 and 102 to each other while being able to slide, will now be described with reference to FIGS. 3 to 7. It is to be noted that only the rear case of the second housing 102 and the front case of the first housing 101 are shown in FIGS. 3 to 7, because they are enough to show the construction of the sliding module. In addition, the second housing 102 and its rear case will be referred to as a second housing 102 as a whole, and the first housing 101 and its front case will be similarly referred to as a first housing 101.

As shown in FIGS. 3 to 7, the sliding module has a guide member 201 mounted on a surface of the first housing 101 and a slide member 202 coupled so as to slide along a guide hole 211, which is formed on the guide member 201. The slide member 202 has a portion supported on a surface of the guide member 201 and the remaining portion extending through the guide hole 211 so that the other end is mounted on the second housing 102. As such, the second housing 102 is mounted on the first housing 101 and is adapted to move linearly on the first housing 101 while being supported by the guide member 201 and the sliding member 202.

The detailed construction of the sliding module will now be described.

The second housing 102 has a pair of guide slits 129 formed on its rear surface in the longitudinal direction. Both lateral ends of the guide member 201 are bent so as to face each other and are coupled to lateral walls of the guide slits 129 while surrounding them. The guide slits 129 are positioned adjacent to both lateral ends of the second housing 102, respectively.

When the guide member 201 is mounted on the first housing 101, the second housing 102 is guided by the guide member 201 so as to slide on the first housing 101. The fact that the rear surface of the second housing 102 faces the guide member 201 and that both lateral ends of the guide members 201 surround the lateral walls of the guide slits 129 limits the transverse play of the second housing 102 relative to the first housing 101.

If both lateral ends of the guide member 201 extend into the second housing 102 through the guide slits 129 and are bent once more, they partially face the inner surface of the second housing 102. Particularly, when both lateral ends of the guide member 201 are bent so as to surround the inner walls of the guide slits 129 and when they are also bent so as to face the inner surface of the second housing 102, the forward/backward play of the second housing 102 relative to the first housing 101 is limited.

In summary, both lateral ends of the guide member 201, which is mounted on the first housing 101, engage with the guide slits 129, which are formed on the rear surface of the second housing 102, and limit the sliding movement of the second housing 102. It is also possible to fasten the second housing 102 to the first housing 101 depending on the shape of both lateral ends of the guide member 201.

Figure 3:
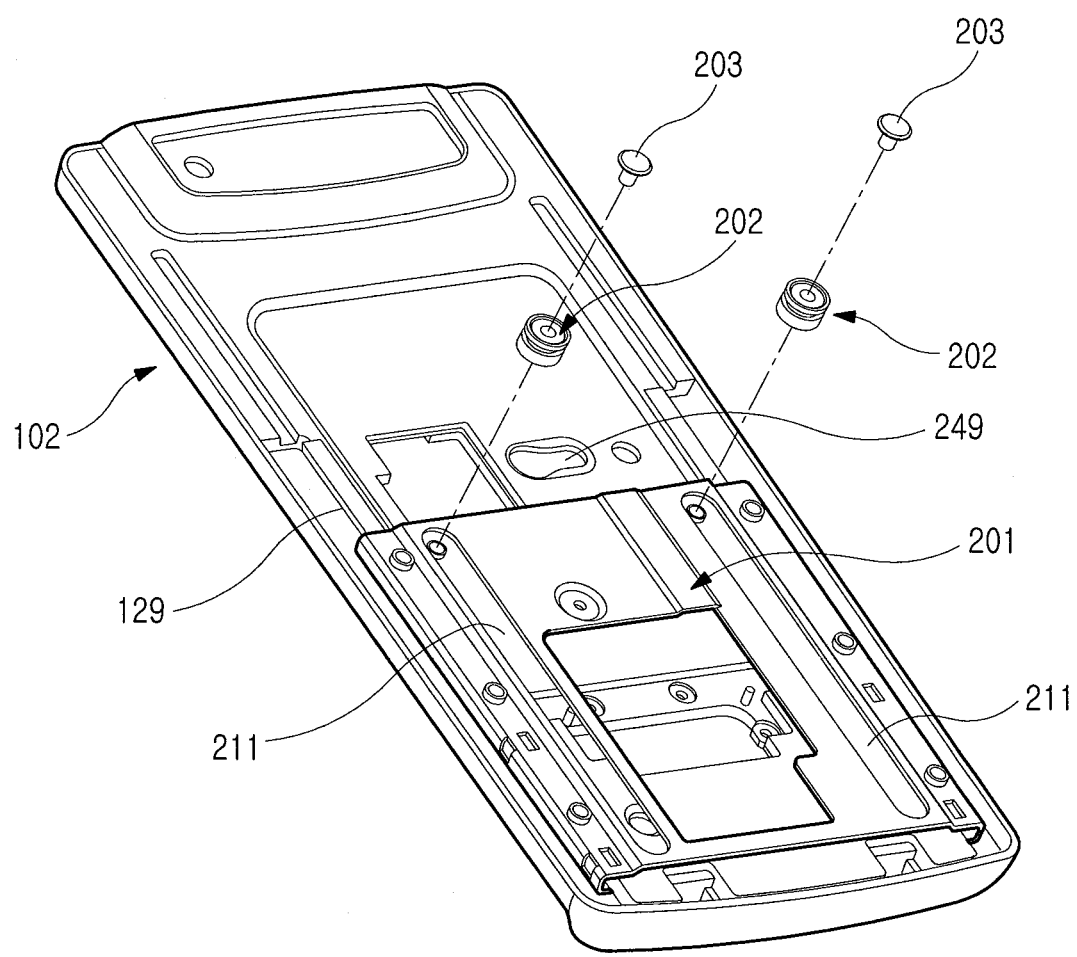
FIG. 3 is an exploded perspective view of a sliding module of the portable terminal shown in FIG. 1.

The slide member 202 is mounted on the second housing 102 via the guide hole 211 with a portion supported on a surface of the guide member 201. As such, the guide member 201 and the second housing 102 are fastened to each other by the slide member 202 so that the second housing 102 can slide on the guide member 201 while being supported by the slide member 202. Referring to FIG. 3, when the guide member 201 is positioned to face the second housing 102, the slide member 202 is placed in the guide hole 211, and a screw 203 extends through the slide member 202 to be fastened to the second housing 102. The slide member 202 thus fastens the second housing 102 and the guide member 201 to each other.

In summary, the second housing 102 is coupled to the first housing 101 by the guide member 129 while being able to slide, and is supported by the slide member 202 to be coupled thereto more stably and slide smoothly.

Although it has been assumed in the present embodiment that a guide hole 211 is formed on each of both lateral ends of the guide member 201, the number of guide holes 211 may vary depending on specific design requirement. In other words, any number of guide holes 211 may be used as long as they stably couple the second housing 102 to the first housing 101 and support the stable sliding movement of the second housing 102.

Figure 5:
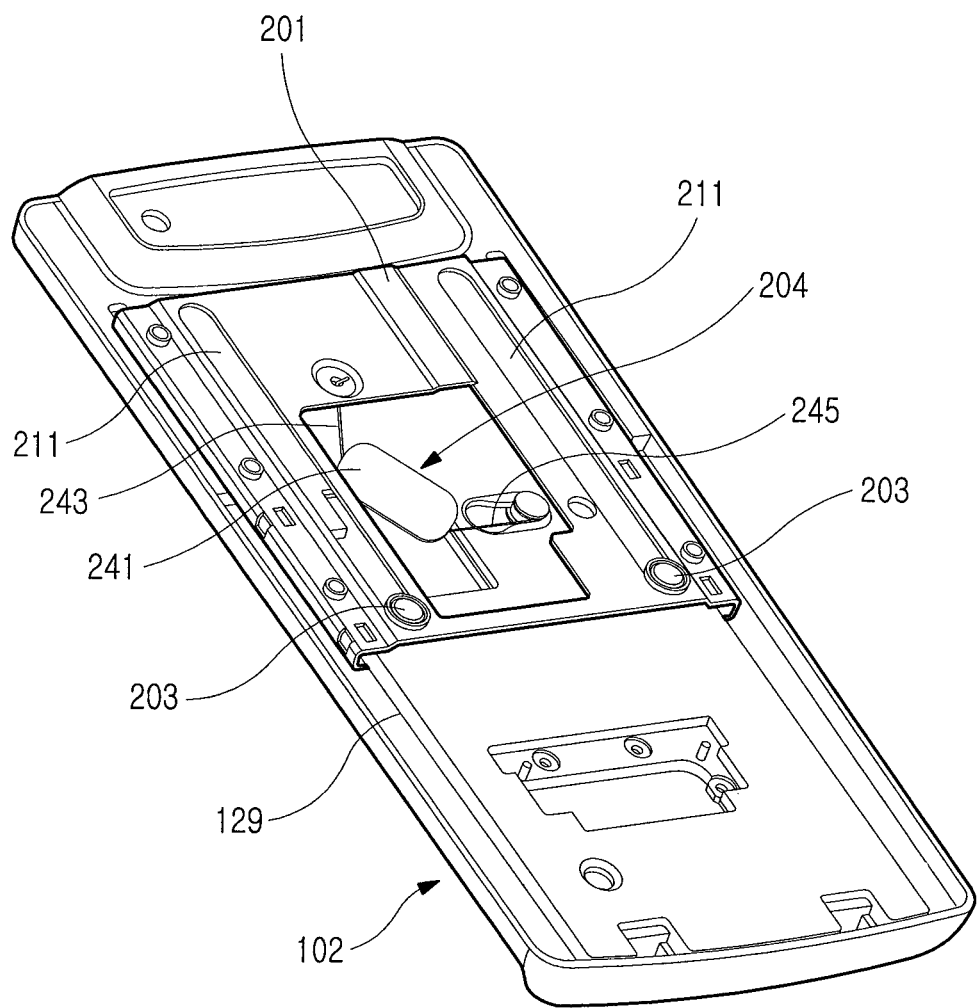
FIG. 5 is a perspective view of the sliding module shown in FIG. 3 when the portable terminal is closed.

FIG. 5 illustrates the second housing 102 and the guide member 201 when the first housing 101 is covered. As shown in FIG. 5, the slide member 202 is mounted at the center of the rear surface of the second housing 102. When the first housing 101 is covered, the guide member 201 is positioned on the upper side of the second housing 102, and the slide member 202 is positioned near the lower end of the guide hole 211. In this state, the keypad 111 is positioned below the guide member 201 and is covered by the second housing 102.

Figure 4:
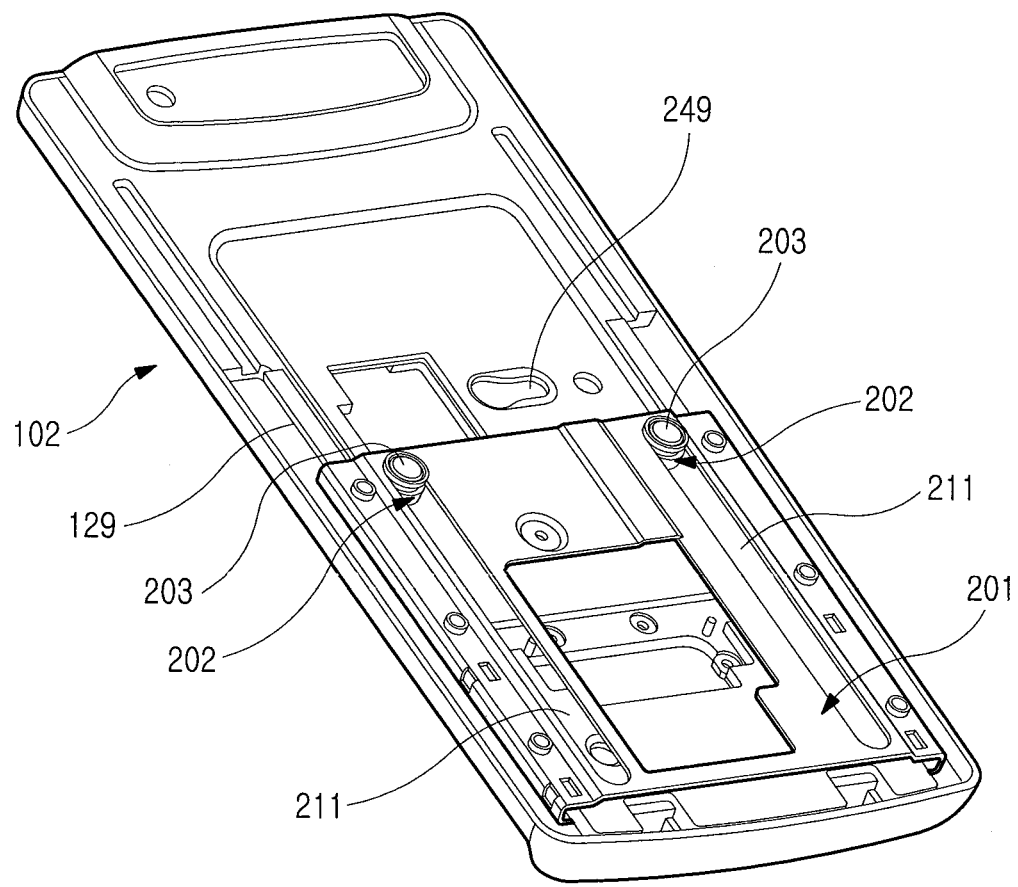
FIG. 4 is an assembled perspective view of the sliding module shown in FIG. 3.

FIG. 4 illustrates the second housing 102 and the guide member 201 when a part of a surface of the first housing 101 is exposed. As shown in FIG. 4, when the first housing 101 is exposed, the guide member 201 is positioned on the lower side of the second housing 102, and the slide member 202 is positioned near the upper end of the guide hole 211. In this state, the keypad 111 is fixed to a surface of the first housing 101 together with the guide member 201, and is exposed as shown in FIG. 2.

The sliding module may have an elastic member 204 in order to provide driving force necessary to slide the second housing 102. The elastic member 204 has one end supported by the guide member 201 and the other end supported by the second housing 102 so as to provide elastic force in such a direction that both ends move away from each other. Both ends of the elastic member 204 will now be referred to as first and second free ends 243 and 245, respectively.

The first free end 243 is press-fitted into the guide member 201 so as to rotate on the guide member 201. The second free end 245 is provided with a roller, which is inserted/fixed into a support hole 249 formed on the second housing 102. The second free end 245 of the elastic member 204 is adapted to rotate about the roller.

For brevity, the elastic member 204 is shown only in FIG. 5, and is omitted from FIGS. 3, 4, 6 and 7. Referring to FIG. 5, the elastic member 204 has a pair of coils (not shown) contained in a housing 241 fabricated by sheet metal working. The first and second free ends 243 and 245 extend from the coils and are supported by the guide member 201 and the second housing 102, respectively.

The elastic member 204 provides driving force in such a direction that the first housing 101 is covered/exposed according to the position of the second housing 102 after a sliding movement.

Referring to FIGS. 1 and 5, when the keypad 111 is covered, the first free end 243 is positioned closer to the upper side than the second free end 245. Although the elastic member 204 provides elastic force in such a direction that the second housing 102 moves downwards, the upper end of the guide member 201 interferes with the upper end of the guide slit 129. As a result, the second housing 102 cannot move downwards any longer. In other words, the second housing 102 remains stationary on the first housing 101 in a stable manner.

If the user moves the second housing 102 upwards while the keypad 111 is covered, the second free end 245 gradually moves upwards and approaches the first free end 243. As a result, an increasing amount of elastic force accumulates in the elastic member 204. The elastic force accumulated in the elastic member 204 acts in such a direction that the second housing 102 moves downwards.

If the second housing 102 keeps moving upwards and goes past a position in which the first and second free ends 243 and 245 are closest to each other, the elastic member 204 provides elastic force in such a direction that the second housing 102 moves upwards.

In summary, the range of movement of the second housing 102 is divided into two by the position in which the first and second free ends 243 and 245 are closest to each other. The driving force moves the second housing 102 downwards when the second housing 102 is in one of the two ranges, and upwards in the other range.

Therefore, when the user wants to expose or cover the keypad 111, he/she has only to move it to a predetermined degree. The elastic force from the elastic member 204 then moves the second housing 102 to the desired location.

Figure 6:
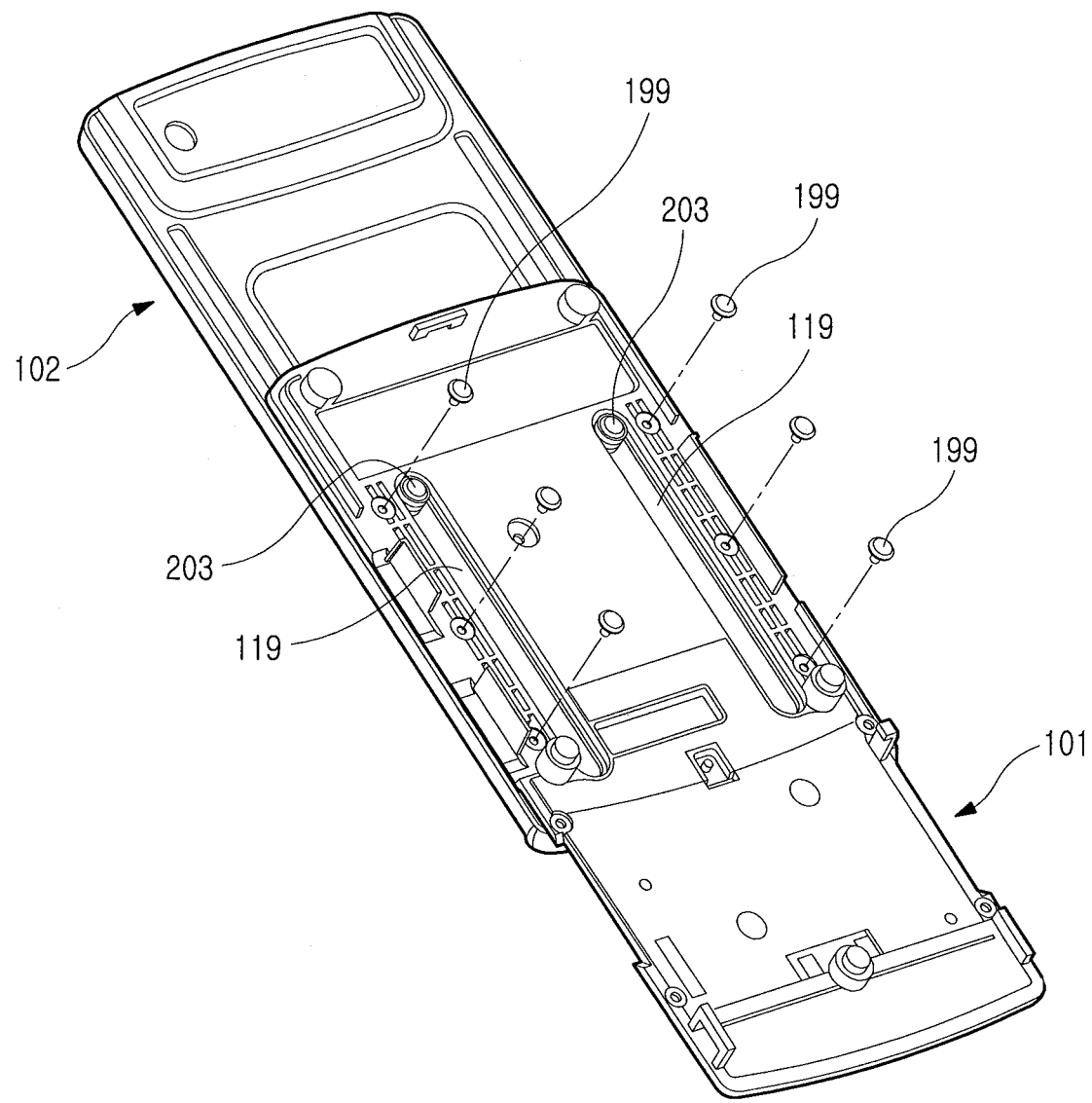
FIG. 6 is an exploded perspective view of the portable terminal shown in FIG. 1 when its first and second housings are coupled to each other.
Figure 7:
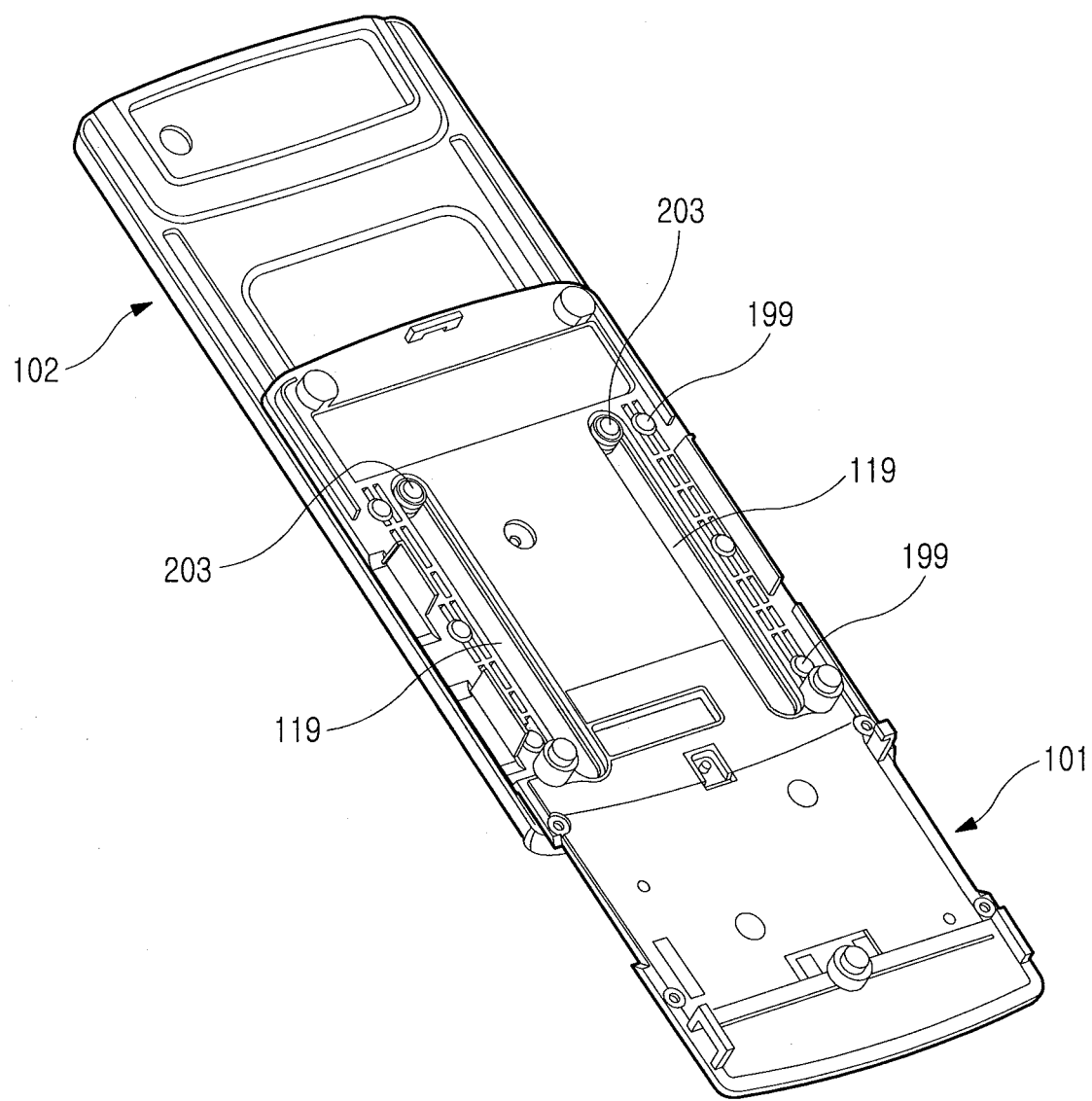
FIG. 7 is an assembled perspective view of the portable terminal shown in FIG. 1 when its first and second housings are coupled to each other.

Referring to FIGS. 6 and 7, after the second housing 102 and the guide member 201 are fastened to each other, the guide member 201 is mounted on the first housing 101. The guide member 201 is placed on the upper side of a surface of the first housing 101 and is fixed to it by fastening screws 199 from inside the first housing 101. The first housing 101 may have receiving holes 119 formed so as to correspond to the guide holes 211. The slide member 202 partially protrudes from a surface of the guide member 201, and the receiving holes 119 receive a part of the sliding member 202 protruding from a surface of the guide member 201.

While the second housing 102 slides, a portion of the slide member 202 moves along the guide holes 211 while being supported by a surface of the guide member 201. As such, both lateral ends of the guide member 201 surround the inner walls of the guide slits 129, respectively, and the slide member 202 engages with the guide hole 211 while being supported on a surface of the guide member 201. This limits the play of the second housing 102 in other directions than the sliding direction, i.e. in the lateral or forward/rearward direction.

In order to secure the structural stability and durability of the guide member 201, which is mounted on the first housing 101 so as to connect the second housing 102 to the first housing 101 and guide its sliding movement, the guide member 201 may be made of a metallic material, e.g. SUS. Similarly, the rear surface of the second housing 102, particularly the lateral walls of the guide slits 129, which undergo direction friction with the guide member 201, may be made of a metallic material so as to increase durability. It is to be noted that a medium made of POM (polyoxymethylene) having excellent mechanical properties (e.g. lubrication, resistance to wear) may be placed between the guide member 201 and the lateral walls of the guide slits 129.

In addition, the slide member 202, which fastens the second housing 102 and the guide member 201 to each other and which moves inside the guide hole 211 and supports the sliding movement of the second housing 102, may be made of POM having excellent mechanical properties (e.g. lubrication, resistance to wear).

As described above, a portable terminal having a sliding module according to an exemplary embodiment of the present invention uses a slide member to fasten the second housing and the guide member to each other and guide the sliding movement of the second housing so that the play in other directions that the sliding direction is limited. This ensures that the housings of the sliding-type terminal can slide smoothly and improves the reliability and durability of the terminal. The fact that the housings do not play in either the lateral or forward/rearward direction even when the terminal is opened or closed relieves the user of irritation or anxiety otherwise caused by the play.

In addition, by bending both lateral ends of the guide member so as to surround the inner walls of the guide slits formed on the second housing, the structural stability of the terminal and the stability of the sliding movement are improved.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A portable terminal comprising:
   a first housing;
   a second housing adapted to slide on the first housing; and
   a sliding module for coupling the second housing to the first housing so as to slide, wherein the sliding module comprises:
     a guide member mounted on a surface of the first housing;
     at least one guide hole extending in a longitudinal direction of the guide member; and
     at least one slide member extending through the guide member via the at least one guide hole to be mounted on the second housing, the at least one slide member moving along the at least one guide hole and supporting a sliding movement of the second housing,
   wherein the at least one slide member is disposed at a fixed position on the second housing during the sliding movement of the second housing, and
   wherein the first housing comprises at least one receiving hole formed so as to correspond to the at least one guide hole, and a portion of the at least one slide member is received in the at least one receiving hole during the sliding movement of the second housing.

2. The portable terminal as claimed in claim 1, wherein one of the at least one guide hole is formed adjacent to each lateral ends of the guide member.

3. The portable terminal as claimed in claim 1, wherein the at least one slide member comprises polyoxymethylene.

4. The portable terminal as claimed in claim 1, wherein each of the at least one slide member is fastened to the second housing by a screw.

5. The portable terminal as claimed in claim 1, wherein the second housing comprises a pair of guide slits formed on a rear surface of the second housing so as to extend in a longitudinal direction of the second housing, and both lateral ends of the guide member are bent so as to face each other and are positioned so as to surround lateral walls of the guide slits.

6. The portable terminal as claimed in claim 5, wherein one of the at least one guide hole is formed adjacent to each lateral end of the guide member.

7. The portable terminal as claimed in claim 6, wherein the at least one slide member comprises polyoxymethylene and each of the at least one slide member is positioned in a corresponding one of the at least one guide hole.

8. The portable terminal as claimed in claim 7, wherein each of the at least one slide member is fastened to the second housing by a screw.

9. The portable terminal as claimed in claim 1, wherein the sliding module comprises an elastic member having a first end supported on the guide member and a second end supported on the second housing, and the elastic member is adapted to provide elastic force in such a direction that both ends of the elastic member move away from each other.

10. The portable terminal as claimed in claim 9, wherein the second housing comprises a pair of guide slits formed on a rear surface of the second housing so as to extend in a longitudinal direction of the second housing, and both lateral ends of the guide member are bent so as to face each other and are positioned so as to surround lateral walls of the guide slits.

11. The portable terminal as claimed in claim 10, wherein one of the at least one guide hole is formed adjacent to each lateral end of the guide member.

12. The portable terminal as claimed in claim 11, wherein the at least one slide member comprises polyoxymethylene and each of the at least one slide member is positioned in a corresponding one of the at least one guide hole.

13. The portable terminal as claimed in claim 12, wherein each of the at least one slide member is fastened to the second housing by a screw.

14. The portable terminal as claimed in claim 9, wherein both ends of the elastic member are closest to each other when a position of the second housing is between an open and closed position.

15. The portable terminal as claimed in claim 1, wherein the at least one slide member comprises a portion supported on a surface of the guide member and a remaining portion extending through the at least one guide hole so that an end is mounted on the second housing.

16. A portable terminal comprising:
    a first housing;
    a guide member mounted on a surface of the first housing;
    a second housing having a pair of guide slits extending on a rear surface in a longitudinal direction;
    a pair of guide holes extending in a longitudinal direction of the guide member; and
    a pair of slide members extending through the guide member via the pair of guide holes to be mounted on the second housing, the pair of slide members moving along the pair of guide holes and supporting a sliding movement of the second housing when the second housing slides,
    wherein each of the pair of slide members is disposed at a fixed position on the second housing during the sliding movement of the second housing,
    wherein both lateral ends of the guide member extend into the second housing via the pair of guide slits so as to fasten the second housing to the first housing and guide a sliding movement of the second housing, and
    wherein the first housing comprises a pair of receiving holes formed so as to correspond to the pair of guide holes, and a portion of each of the pair of slide members is received in a corresponding one of the pair of receiving holes during the sliding movement of the second housing.

17. The portable terminal as claimed in claim 16, wherein each of the pair of slide members comprises a portion supported on a surface of the guide member and a remaining portion extending through a corresponding one of the pair of guide holes so that an end is mounted on the second housing.

\* \* \* \* \*